(12) United States Patent
Wang et al.

(10) Patent No.: US 12,050,024 B2
(45) Date of Patent: Jul. 30, 2024

(54) AIR PURIFYING DEVICE

(71) Applicant: Beijing Xiaomi Mobile Software Co., Ltd., Beijing (CN)

(72) Inventors: Jian Wang, Beijing (CN); Kenan Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 407 days.

(21) Appl. No.: 17/681,002

(22) Filed: Feb. 25, 2022

(65) Prior Publication Data

US 2023/0133913 A1    May 4, 2023

(30) Foreign Application Priority Data

Nov. 4, 2021  (CN) .......................... 202111299024.8

(51) Int. Cl.
*F24F 8/10* (2021.01)
*F24F 13/08* (2006.01)
*F24F 13/20* (2006.01)

(52) U.S. Cl.
CPC ................ *F24F 8/10* (2021.01); *F24F 13/08* (2013.01); *F24F 13/20* (2013.01)

(58) Field of Classification Search
CPC .. F24F 11/79; F24F 13/08; F24F 13/20; F24F 13/28; F24F 8/00; F24F 8/10; F24F 8/108; F24F 8/158; F24F 8/192; F24F 8/80
USPC .......................................................... 96/372
See application file for complete search history.

(56) References Cited

U.S. PATENT DOCUMENTS

2020/0063991 A1    2/2020  Bae et al.
2021/0080130 A1*   3/2021  Shimizu ................. B01D 46/10

FOREIGN PATENT DOCUMENTS

| CN | 107387443 A | 11/2017 |
|---|---|---|
| CN | 108072122 A | 5/2018 |
| CN | 207455793 U | 6/2018 |
| CN | 208332493 U | * 1/2019 |
| CN | 208365675 U | 1/2019 |
| CN | 208620538 U | 3/2019 |
| CN | 110160163 A | 8/2019 |

(Continued)

OTHER PUBLICATIONS

Zhuang et al. (Year: 2019).*

(Continued)

*Primary Examiner* — Sharon Pregler
(74) *Attorney, Agent, or Firm* — Volpe Koenig

(57) ABSTRACT

An air purifying device includes a purifying apparatus including a hollow purifying shell having an interior forming a purifying cavity. A filtering component configured to filter air is disposed in the purifying cavity. An air supply apparatus includes an air supply shell. An interior of the air supply shell is hollow to form an air supply cavity. An air supply inlet and an air supply outlet communicating with the air supply cavity are formed in the air supply shell. The air supply apparatus is configured to supply air outwards. The air purifying device includes an air guide apparatus that includes an air guide shell. An interior of the air guide shell is hollow to form an air guide cavity. The air guide apparatus is configured to deliver air into the air supply apparatus. An air flow driving apparatus is disposed in the purifying apparatus and/or the air supply apparatus.

18 Claims, 6 Drawing Sheets

(56) References Cited

FOREIGN PATENT DOCUMENTS

| | | |
|---|---|---|
| CN | 110916332 A | 3/2020 |
| CN | 111927802 A | 11/2020 |
| CN | 112922872 A | 6/2021 |
| KR | 20140096971 A | 8/2014 |
| KR | 102236520 B1 | 4/2021 |
| WO | 2011/045979 A1 | 4/2011 |

OTHER PUBLICATIONS

Notification to Grant Patent Right and the Notification to Go through Formalities of Registration of Chinese application No. 202111299024.8 issued on Mar. 19, 2023.
Extended European Search Report dated Aug. 3, 2022 for European Patent Application No. 22158747.0.
Chinese Office Action dated Aug. 23, 2022 for Chinese Patent Application No. 202111299024.8.

* cited by examiner

AIR PURIFYING DEVICE

CROSS REFERENCE TO RELATED APPLICATION

The present application is provided based on and claims priority to the Chinese Patent Application No. 202111299024.8, filed on Nov. 4, 2021. The entire contents of the above-listed application are hereby incorporated herein by reference for all purposes.

BACKGROUND

An air purifying device improves air cleanliness by adsorption, decomposition or conversion of various air pollutants so as to provide a more comfortable air environment for a user. An electric fan blows air to cool down air in a high air temperature environment.

In the related art, the air purifying device is combined with the electric fan so as to improve the quality of the air supplied by the electric fan. However, air purified by the air purifying device is mixed with outside air and then blown out through the electric fan. Consequently, air blown out by the electric fan is mixed with non-purified air, and the experience of the user is degraded.

SUMMARY

The disclosure relates to the technical field of environmental electric appliances, in particular to an air purifying device.

According to the technical solution of the disclosure, an air purifying device is provided and includes: a purifying apparatus, including a purifying shell. An interior of the purifying shell is hollow to form a purifying cavity. The apparatus further includes a purifying inlet and a purifying outlet in communication with the purifying cavity and formed in the purifying shell. A filtering component is arranged in the purifying cavity and configured to filter air which flows into the purifying cavity from the purifying inlet. The apparatus further includes an air supply apparatus, including an air supply shell. An interior of the air supply shell is hollow to form an air supply cavity. An air supply inlet and an air supply outlet which communicate with the air supply cavity are formed in the air supply shell. The air supply apparatus is configured to supply air outwards.

The apparatus further includes an air guide apparatus, including an air guide shell. An interior of the air guide shell is hollow to form an air guide cavity. An air guide inlet and an air guide outlet are formed in the air guide shell. The air guide inlet communicates with the purifying outlet. The air guide outlet communicates with the air supply inlet. The air guide apparatus is configured to deliver air output by the purifying apparatus into the air supply apparatus. An air flow driving apparatus is disposed in the purifying apparatus and/or the air supply apparatus. The air flow driving apparatus is configured to drive air flow so as to enter the purifying cavity from outside of the purifying shell via the purifying inlet, flow through the air guide apparatus and the air supply apparatus, and then flow out from the air supply outlet.

It should be understood that the above general description and the following detailed description are only explanatory and are not intended to be limiting of the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the disclosure.

DETAILED DESCRIPTION

Figure 1:
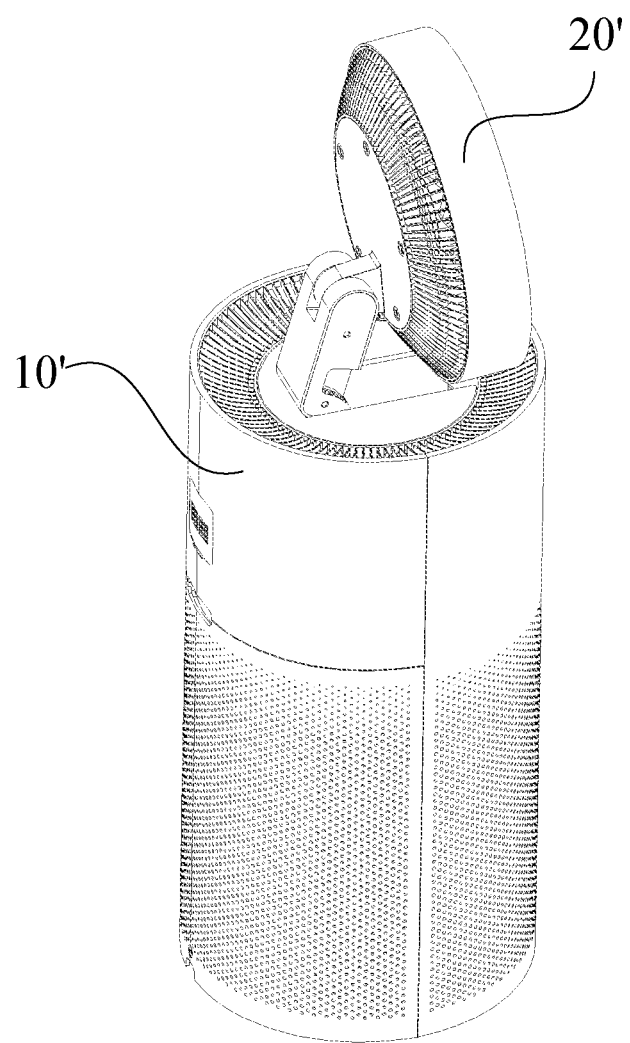
FIG. 1 is a schematic diagram of an air purifier fan shown in the related art.

The embodiments will be described in detail here, and examples are represented in the drawings. When the following description concerns the drawings, the same numbers in the different drawing figures represent the same or similar elements unless otherwise indicated. Described implementations in the following embodiments do not represent all implementations consistent with the disclosure. Rather, they are only examples of an apparatus consistent with some aspects of the disclosure as detailed in the appended claims.

As shown in FIG. 1, an air purifier fan is provided in the related art, including an air purifier 10' and a fan 20.' A grid-shaped air outlet is formed in an upper portion of the air purifier 10.' An air inlet is formed in a lower portion of the air purifier 10.' An motor and a filter element are arranged inside the air purifier 10.' The engine is configured to drive air flow such that the air enters via the air inlet from the outside of the air purifier 10' to be purified through the filter element and discharged from the air outlet. The fan 20' is arranged above the air outlet of the air purifier 10.' When the fan 20' rotates, a negative pressure is generated at the air inlet of a back of the fan 20' so as to suck in surrounding air. Part of the purified air is discharged from the air outlet of the air purifier 10' and blows towards a user under a driving force of the fan blades.

The air purifier fan provided in the related art has the following drawbacks. The air inlet of the fan 20' simultaneously sucks in the purified air and non-purified air. As a result, air flow blown out by the fan 20' is mixed with the non-purified air. Consequently, air cleanliness of air blown out by the fan 20' is low, and the air supply quality of the fan 20' is degraded. Besides, as the air purifier 10' and the fan 20' in the related art work independently, motors need to be arranged on the air purifier 10' and the fan 20' respectively. The two motors need to run at the same time. Consequently, not only is power consumption is increased, production cost of a product is increased as well.

Figure 2:
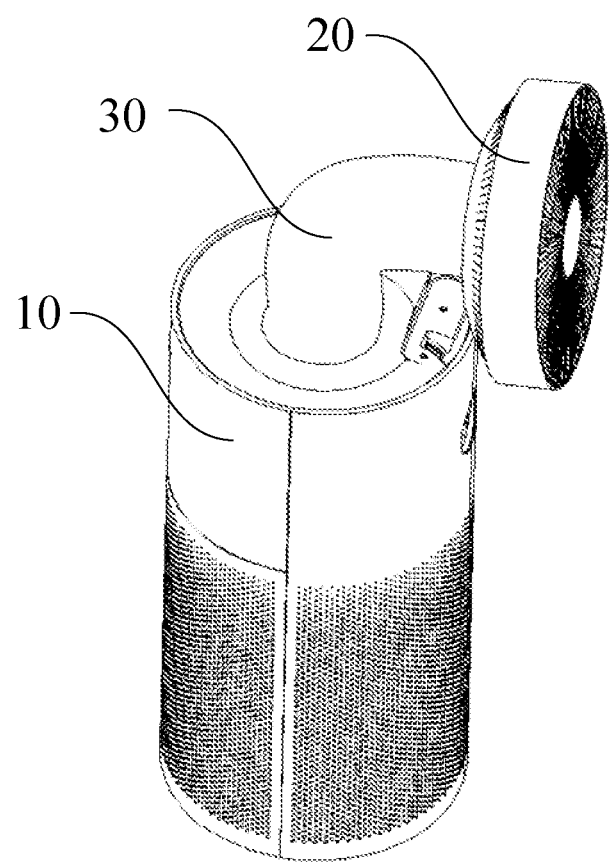
FIG. 2 is a schematic diagram of an air purifying device shown according to an embodiment.
Figure 3:
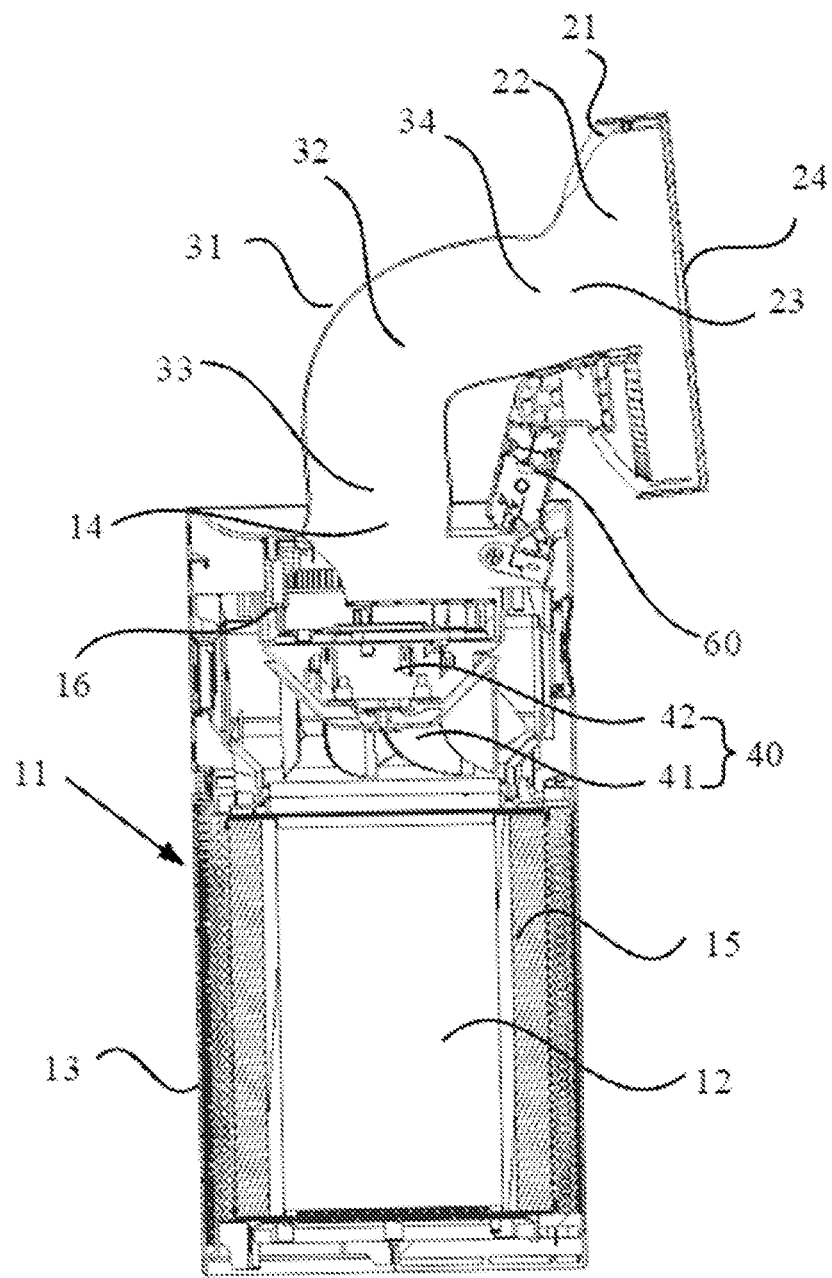
FIG. 3 is a schematic diagram of an air purifying device shown according to an embodiment.

In order to solve the above technical problem, the examples of the disclosure provide an improved air purifying device. As shown in FIG. 2 and FIG. 3, an air purifying device includes a purifying apparatus 10, an air supply apparatus 20, an air guide apparatus 30 and an air flow driving apparatus 40. The purifying apparatus 10 can purify air flowing thereinto. The air guide apparatus 30 communicates with a purifying outlet of the purifying apparatus 10 and an air supply inlet of the air supply apparatus 20 respectively. The air flow driving apparatus 40 is arranged inside the purifying apparatus 10 or the air supply apparatus 20.

Alternatively, the purifying apparatus 10 and the air supply apparatus 20 each have an air flow driving apparatus

40. The air flow driving apparatus 40 drives air to enter the purifying apparatus 10. Air purified by the purifying apparatus 10 flows into the air supply apparatus 20 via the air guide apparatus 30, and then purified air is discharged outwards via the air supply apparatus 20 and delivered to a user. The air guide apparatus 30 is configured so that an air flow purified by the purifying apparatus 10 is delivered into the air supply apparatus 20 while preventing the non-purified air from entering the air supply apparatus 20. This arrangement improves the air supply quality of the air supply apparatus 20.

An embodiment according to the disclosure is shown in FIG. 2 and FIG. 3. This embodiment provides an air purifying device including a purifying apparatus 10, an air supply apparatus 20, an air guide apparatus 30 and an air flow driving apparatus 40. The purifying apparatus 10 includes a purifying shell 11. An interior of the purifying shell 11 is hollow to form a purifying cavity 12. A purifying inlet 13 and purifying outlet 14 communicate with the purifying cavity 12 and are formed in the purifying shell 11. A filtering component 15 is arranged in the purifying cavity 12 and configured to filter air flowing into the purifying cavity 12 from the purifying inlet 13.

Figure 4:
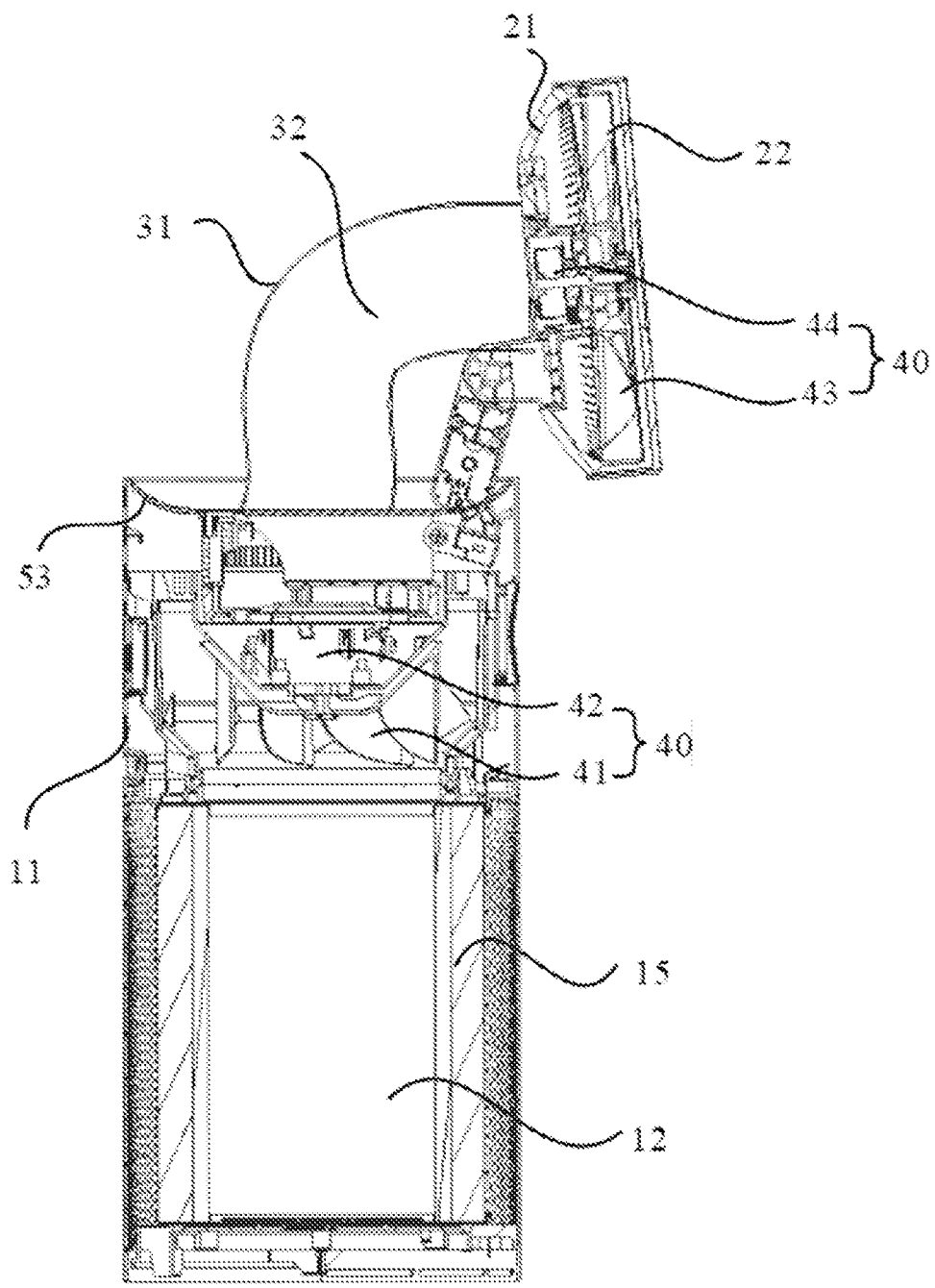
FIG. 4 is a schematic diagram of an air purifying device shown according to an embodiment.

According to the embodiment shown in FIG. 3 and FIG. 4, a purifying inlet 13 is formed in a region corresponding to the filtering component 15, of a side wall of the purifying shell 11. For example, the purifying inlet 13 includes a plurality of micro holes densely distributed in the purifying shell 11 so as to confer upon the purifying shell 11 a multi-hole mesh shape. In the embodiment, the purifying inlet is arranged to have a micro-hole structure that increases an entering air volume per unit time. Further, a plurality of purifying inlets 13 is arranged so that an air flow can uniformly pass through the filtering component 15. This arrangement increases a utilization ratio of the filtering component 15.

According to the embodiment shown in FIG. 3 and FIG. 4, the filtering component 15 is formed to have a generally annular tubular shape. An outer wall of the filtering component 15 is close to an inner wall of the purifying shell 11. The filtering component 15 includes but is not limited to an efficient particle air purifier, an electrostatic electret filter mesh and an activated carbon filter mesh. The filtering component 15 is mainly configured to purify indoor air in a home environment by adsorption, decomposition or conversion of fine particulate matter (PM2.5), pollen, unpleasant odor, formaldehyde, bacteria, allergens and other substances possibly existing in the indoor air, thereby improving cleanliness of air flowing into the purifying apparatus 10.

The air supply apparatus 20 includes an air supply shell 21. An interior of the air supply shell 21 is hollow to form an air supply cavity 22. An air supply inlet 23 and an air supply outlet 24 communicate with the air supply cavity 22 and are formed in the air supply shell 21. The air supply apparatus 20 is configured to supply air in an outward direction flowing towards a region where the air supply outlet 24 of the air supply apparatus 20 faces the external environment, so that kinetic energy of air purified by the purifying apparatus 10 is increased as air flows toward the air supply outlet 24. As a result, the purified air can be delivered by the air supply apparatus 20 to a region farther away from the air purifying device than it would otherwise be delivered. In that manner, circulating flow of the indoor air is facilitated.

Advantageously, the air supply apparatus 20 supplies air towards the user in a hot environment to accelerate evaporation of sweat on a body surface of the user so as to make the user feel cool. The air supply shell 21 is of a gradual-expanding, generally trumpet-shaped structure that expands in volume in an outward-flowing direction of the air flow so that a cross sectional area through which outflowing air passes as it flows toward the air supply outlet 24 of the air supply apparatus 20 increases toward the air supply outlet 24. Thus, an external area to which air is supplied by the air supply apparatus 20 is enlarged. In another embodiment, a grille configured to cover the air supply outlet 24 is arranged at the air supply outlet 24.

The air guide apparatus 30 includes an air guide shell 31. An interior of the air guide shell 31 is hollow to form an air guide cavity 32. An air guide inlet 33 and an air guide outlet 34 are formed in the air guide shell 31. The air guide inlet 33 communicates with the purifying outlet 14 and the air guide outlet 34 communicates with the air supply inlet 23, so that the air guide apparatus 30 forms an enclosed air flowing channel between the purifying apparatus 10 and the air supply apparatus 20. The air purified in the purifying apparatus 10 flows out from the purifying outlet 14 of the purifying apparatus 10 and then flows to the air supply apparatus 20 via the air guide apparatus 30, so that air entering the air supply apparatus 20 is prevented from being mixed with the non-purified air. Thus, cleanliness of the air blown out by the air supply apparatus 20 is improved.

In another embodiment, the air guide shell 31 has a generally tubular shape and is made of a flexible material so that the air guide shell 31 can be bent, so as to change direction of the air that is flowing out from the purifying outlet 14 of the purifying apparatus 10 before the air flows into the air supply cavity 22. In that arrangement, the flowing direction of the air flowing out from the purifying outlet 14 remains consistent with a flowing direction of the air blown out by the air supply apparatus 20, thereby reducing kinetic energy loss during flowing of the air between the purifying outlet 14 and air supply outlet 24. In this arrangement air flows more smoothly than it otherwise would flow, and the outflowing air volume of the air supply apparatus 20 is increased. A bent region of the air guide cavity 32 bends in a smooth transition so that a resistance during flowing of the air in the air guide cavity 32 is further reduced.

In an embodiment shown in FIG. 3, the air supply shell 21 and the air guide shell 31 are of an integrated structure. The air guide apparatus 30 is of a bent structure. There is no need for an assembling seam and a staggered structure between the air supply shell 21 and the air guide shell 31. Therefore, the interiors of the air supply shell 21 and the air guide shell 31 form smoother air flowing conduits, and the resistance while the air flows through the air guide cavity 32 and the air supply cavity 22 is reduced commensurately.

The air flow driving apparatus 40 is arranged in the purifying apparatus 10 and/or the air supply apparatus 20 and is configured to drive the air flow to enter the purifying cavity 12 from the outside of the purifying shell 11 via the purifying inlet 13, passing through the air guide apparatus 30 and the air supply apparatus 20 and then flowing out from the air supply outlet 24. The air flow driving apparatus 40 includes a motor, and different types of motors can be selected according to different demands. For example, suitable motors include, but are not limited to an axial flow motor, a centrifugal motor, etc.

In the embodiment shown in FIG. 3, the air flow driving apparatus 40 includes a first impeller 41 and a first motor 42. The first impeller 41 is disposed in the purifying cavity 12. An output end of the first motor 42 is connected with the first impeller 41 so as to drive the first impeller 41 to rotate, so that the air flow driving apparatus 40 drives the air in the purifying apparatus 10 to flow towards the air guide apparatus 20 via the air guide apparatus 30, to be supplied outwards by the air supply apparatus 20. According to the air purifying device provided by the embodiment, an air purifying function and an air supply function can be realized using one air flow driving apparatus 40. Accordingly, power consumption is reduced, structure of the air purifying device is simplified, and the production cost of the product is reduced.

Figure 5:
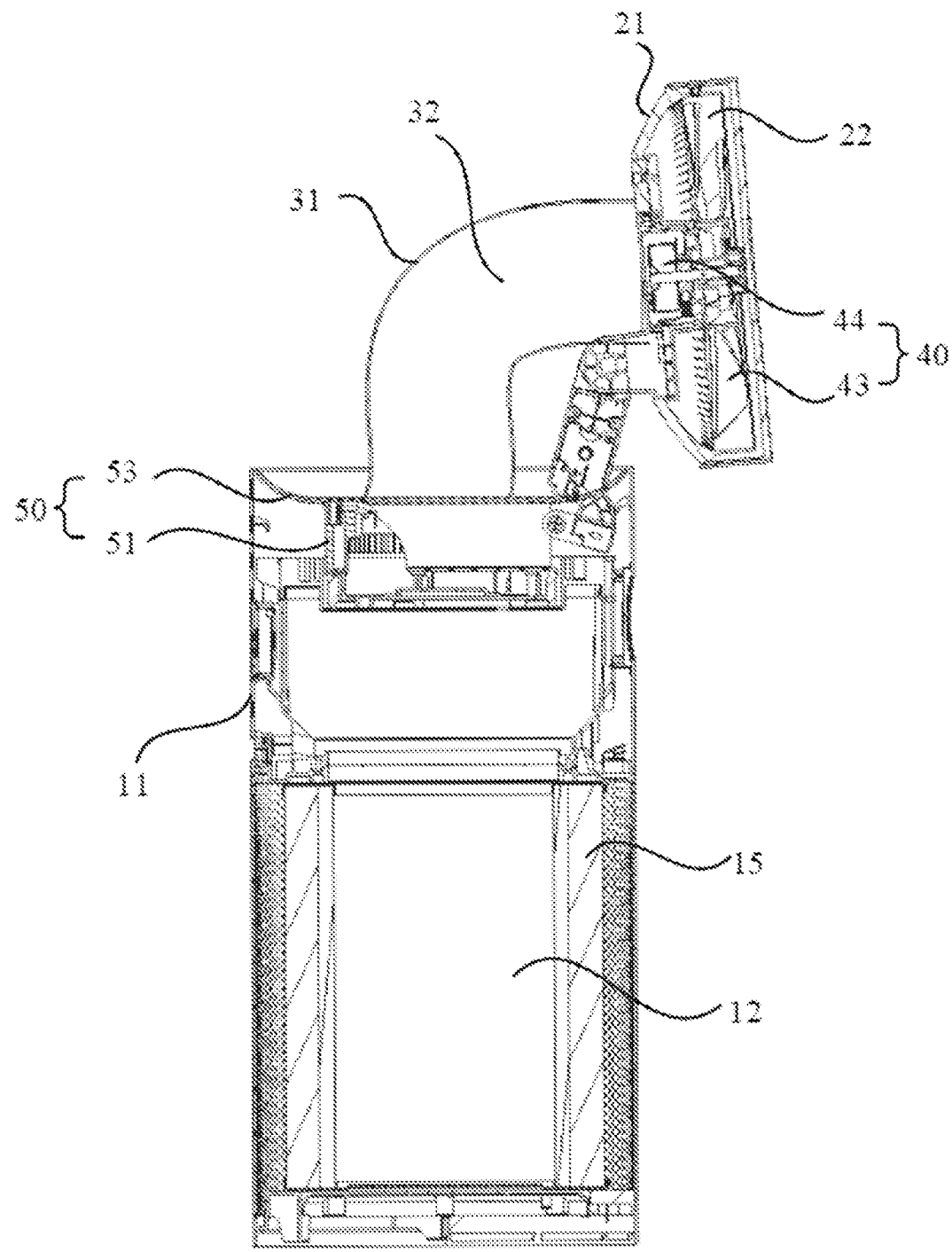
FIG. 5 is a schematic diagram of an air purifying device shown according to an embodiment.

In an embodiment shown in FIG. 5, the air flow driving apparatus 40 includes a second impeller 43 and a second motor 44. The second impeller 43 is disposed in the air supply cavity 22. An output end of the second motor 44 is connected with the second impeller 43 so as to drive the second impeller 43 to rotate in a direction that allows the air flow driving apparatus 40 to drive the air in the air supply apparatus 20 so as to be discharged outwards.

The arrangement generates a differential pressure at the air supply inlet 23 (see FIG. 3) of the air supply apparatus 20. Under the action of the differential pressure, the air in the air guide apparatus 30 and the purifying apparatus 10 flows towards the air supply apparatus 20. A pressure difference is generated between the inside and the outside of the purifying apparatus 10 that draws outside air to enter the purifying apparatus 10. According to the air purifying device provided by the embodiment, an air purifying function and an air supply function can be realized using one air flow driving apparatus 40. Consequently, power consumption is reduced, structure of the air purifying device as a whole is simplified, and the production cost of the product is reduced.

In an embodiment shown in FIG. 4, the air flow driving apparatus 40 includes a first impeller 41 and a first motor 42, and a second impeller 43 and a second motor 44. The first impeller 41 is disposed in the purifying cavity 12. The second impeller 43 is disposed in the air supply cavity 22. The interiors of the purifying cavity 12 and the air supply cavity 22 each have an air flow driving apparatus 40 thereby increasing air purifying amount and air supply volume delivered by the air purifying device. The use of the two air flow driving apparatuses 40 improves air purifying and air supply efficiency of the air purifying device.

Figure 6:
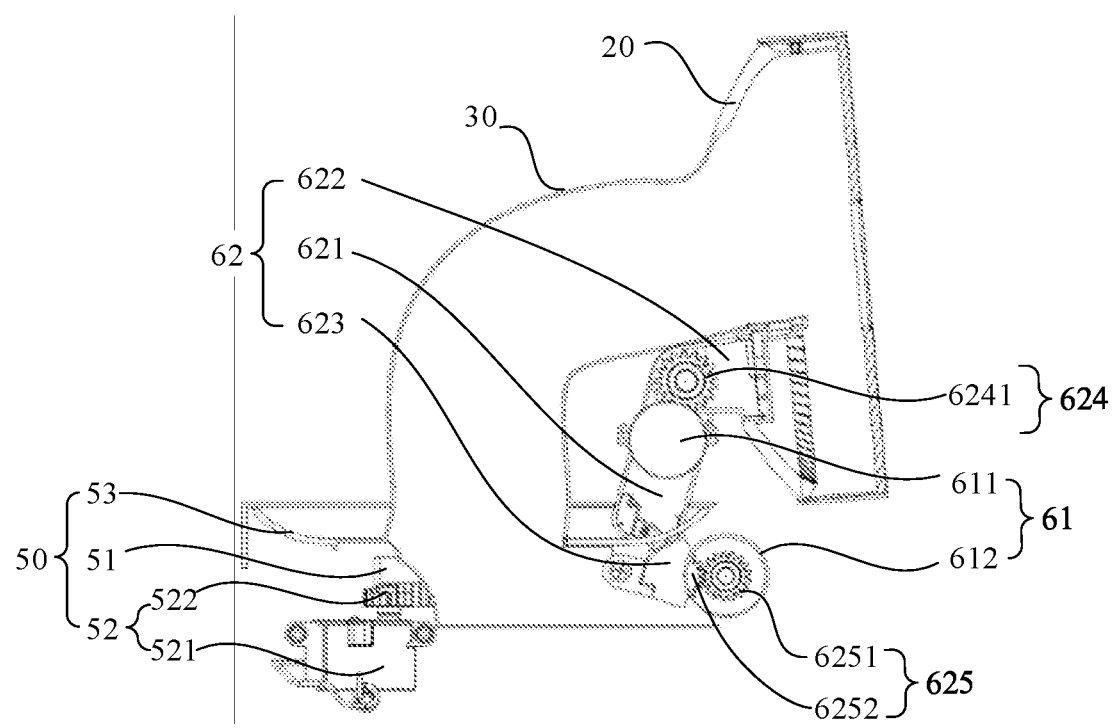
FIG. 6 is a schematic diagram of an air purifying device shown according to an embodiment.

In the embodiment shown in FIG. 5 and FIG. 6, the air purifying device further includes a rotating component 50. The rotating component 50 is configured to drive the air supply apparatus 20 to at least partially rotate about an axis of the purifying apparatus 10 so as to change an air supply direction of the air supply apparatus 20 over time, thereby enlarging the area to which air is supplied by the air supply apparatus 20.

For example, in an environment in which many persons surround the air purifying device, supply apparatus 20 rotates relative to the purifying apparatus 10 so as to deliver air blown out by the air supply apparatus 20 towards each of the many persons in sequence over time. Specifically, the rotating component 50 includes a rotating body 51, a rotating driving portion 52 and an upper cover 53. The rotating body 51 is disposed in the purifying shell 11. The rotating body 51 has a generally tubular shape having an upper and lower opening. The lower opening of the rotating body 51 communicates with the purifying cavity 12.

A shape and size of the upper opening of the rotating body 51 are matched with a shape and size of the air guide inlet 33. The upper opening of the rotating body 51 is connected with and communicates with the air guide inlet 33 of the air guide shell 31. The air purified in the purifying cavity 12 enters the air guide cavity 32 and passes through the interior of the rotating body 51.

The rotating driving portion 52 includes a rotating motor 521 and a rotating transmission part 522. The rotating motor 521 has a rotating power output end and is configured to output rotating power. The rotating transmission part 522 is fixedly connected with the rotating power output end and the rotating body 51 respectively, and is configured to transmit the rotating power output by the rotating motor 521 to the rotating body 51 so as to drive the rotating body 51 to rotate relative to the purifying shell 11.

The air guide apparatus 30 is fixedly connected with the rotating body 51 and can be driven to rotate synchronously in accordance with the rotation of rotating body 51. A bottom end of the air guide shell 31 is forms an opening. The upper cover 53 is arranged at the opening and configured to seal a gap between the opening and the rotating body 51, so that the purified air in the purifying cavity 12 is prevented from leaking from the opening. In an embodiment, the upper cover 53 is fixedly connected with the rotating body 51 so as to rotate synchronously with the rotating body 51. This prevents the purified air from scattering at will.

In this embodiment, a supporting portion 16 (best illustrated in FIG. 3) is arranged in the purifying shell 11. The supporting 16 is connected with an inner side wall of the purifying shell 11. one side surface of the rotating body 51 facing the supporting portion 16 abuts against the supporting portion 16, and a supporting force can be provided for the rotating body 51 through the supporting portion 16. Besides, an annular groove (not shown) is formed on one side surface of the supporting portion 16 facing the rotating body 51. An annular protrusion (not shown) matched with the annular groove is arranged on one side surface of the rotating body 51 facing the supporting portion 16. The annular protrusion of the rotating body 51 extends into the annular groove of the supporting portion 16 so that rotation of the rotating body 51 around an axis is limited through cooperation of the annular protrusion and the annular groove, thereby improving rotational stability of the rotating body 51. The rotating motor 521 is installed on the supporting portion 16. The rotating transmission part 522 includes two mutually-engaged gears, the two gears are arranged at the rotating power output end of the rotating motor 521 and the rotating body 51 respectively, and are configured to transmit the rotational power output by the rotating motor 521 to the rotating body 51 so as to drive the rotating body 51 to rotate. Rotation of the rotating body 51 drives the air guide apparatus 30 and the air supply apparatus 20 to rotate, whereby the air supply direction of the air supply apparatus 20 is changed over time, and the air supply apparatus 20 can supply air in a circumferential direction about the purifying apparatus 10.

In this embodiment, the air purifying device further includes a pitching component 60. The pitching component 60 is configured to drive the air supply apparatus 20 to perform a pitching motion relative to the purifying apparatus 10 so as to adjust an orientation of the air flow blown out by the air supply apparatus 20 in a height or vertical direction with respect to a surface upon which the air purifying device is placed. For example, when the air purifying device is positioned beneath a user, in order to make the air flow blow upwards towards the user (who is at a higher position relative to the air purifying device), the air supply apparatus 20 is made to pitch up relative to the purifying apparatus 10. On the other hand, when the air purifying device is located at a position above the user, in order to make the air flow blow towards the user (who is in a lower position with respect to the air purifying device), the air supply apparatus 20 is made to pitch down relative to the purifying apparatus 10.

Specifically, the pitching component 60 includes a pitching motor 61 and a pitching transmission part 62. The pitching motor 61 has a pitching power output end and is configured to output rotational power. The pitching transmission part 62 is fixedly connected with the pitching power output end and the air supply shell 21 respectively, and is configured to transmit pitching power output by the pitching motor 61 to the air supply shell 21 so as to make the air supply shell 21 perform the pitching motion. The pitching transmission part 62 is further fixedly connected with the upper cover 53 or the rotating body 51 so as to rotate synchronously along with rotation of the upper cover 53 or the rotation of the rotating body 51 as the upper cover 53 or the rotating body 51 rotates.

As shown in FIG. 6, the pitching transmission part 62 includes a main body portion 621, a first connection portion 622 and a second connection portion 623. The pitching motor 61 includes a first pitching motor 611 and a second pitching motor 612. The main body portion 621 includes opposing first end and a second ends. The first connection portion 622 includes opposing first end and a second ends. The first end of the first connection portion 622 is fixed to the air supply shell 21. The second end of the first connection portion 622 is movably connected with the first end of the main body portion 621 through a first movable part 624. The first pitching motor 611 is fixed to the main body portion 621. A torque output end of the first pitching motor 611 is in transmission connection with the first movable part 624.

When the first pitching motor 611 is in operation, the first movable part 624 is driven to rotate so as to drive the first connection portion 622 movably connected with the first movable part 624 to rotate relative to the main body portion 621. The first end of the first connection portion 622 is fixedly connected with the air supply shell 21 such that the first connection portion 622 drives the air supply shell 21 to rotate relative to the main body portion 621, and pitching action of the air supply apparatus 20 is thereby realized. The second connection portion 623 includes opposing first and second ends. The first end of the second connection portion 623 is fixed to the rotating body 51 or the upper cover 53. The second end of the second connection portion 623 is movably connected with the second end of the main body portion 621 through a second movable part 625. The second pitching motor 612 is fixed to the rotating body 51. The second pitching motor 612 can rotate along with the rotating body 51 while the rotating body 51 is driven by the rotating motor 521 to rotate.

A torque output end of the second pitching motor 612 is in transmission connection with the second movable part 625. When the second pitching motor 612 is in operation, the second movable part 625 is driven to rotate so as to drive the main body portion 621, which is movably connected with the second movable part 625 to rotate relative to the rotating body 51. Then, the first connection portion 622 and the air supply shell 21 are driven by the main body portion 621 to rotate relative to the rotating body 51, and the pitching action of the air supply apparatus 20 is realized.

In the embodiment shown in FIG. 6, the first movable part 624 and the second movable part 625 each include at least one gear. Specifically, the first movable part 624 includes a first gear (not shown in figure) mutually-engaged with a second gear 6241. The first pitching motor 611 is fixed to the main body portion 621 through a bolt. The first gear is fixedly arranged at a power output end of the first pitching motor 611. The second gear 6241 is fixedly arranged at the second end of the first connection portion 622. When the first pitching motor 611 drives the first gear to rotate, the second gear 6241 is driven to rotate, and the first connection portion 622 is driven to rotate relative to the main body portion 621, whereby the air supply apparatus 20 is driven to pitch up or pitch down.

The second movable part 625 includes a third gear 6251 mutually-engaged with a fourth gear 6252. The third gear 6251 is fixedly arranged at a power output end of the second pitching motor 612. The fourth gear 6252 is fixedly arranged at the second end of the second connection portion 623. When the second pitching motor 612 drives the third gear 6251 to rotate, the fourth gear 6252 is driven to rotate, and then the second connection portion 623 is driven to rotate relative to the rotating body 51.

In this embodiment, in order to improve the air supply experience of the user, the air supply apparatus 20 is arranged not only to rotate relative to the purifying apparatus 10, but also to perform pitching motion relative to the purifying apparatus 10 so that more air is provided in a vertical space (in a direction either above or below the air supply apparatus 10). At the same time, a 360° circular air supply delivery is realized, increasing the comfort of the user and improving competitiveness of the product.

In the embodiment shown in FIG. 2, the grille is further arranged on the air supply apparatus 20 so as to prevent the fan blades arranged in the air supply apparatus 20 from falling off and flying out away from the air supply apparatus 20. The air supply apparatus 20 and the air guide apparatus 30 are of an integrated structure so that the structure of the air purifying device is simple and easy to assemble, and the production cost is reduced.

The technical solutions provided in some examples of the disclosure may include the following beneficial effects. The air guide apparatus communicates with the purifying outlet of the purifying apparatus and the air supply inlet of the air supply apparatus so that the air purified by the purifying apparatus can be delivered to the air supply apparatus via the air guide apparatus and blown out by the air supply apparatus. Accordingly, the air supply apparatus can blow out air with higher quantity, and experience of the user is improved.

Those skilled in the art will easily appreciate other implementations of the disclosure after considering the specification and the disclosure provided herein. The present application aims to cover any transformation, application or adaptive change of the disclosure which conforms to a general principle of the disclosure and includes common general knowledge or conventional technical means which are not expressly disclosed.

It should be understood that the disclosure is not limited to the precise structures described above and shown in the drawings and admits various modifications and changes without departing from its scope. The scope of the disclosure is limited only by the appended claims.

What is claimed is:

1. An air purifying device comprising:
   a purifying apparatus comprising:
      a purifying shell, wherein an interior of the purifying shell is hollow to form a purifying cavity;
      a purifying inlet and a purifying outlet which communicate with the purifying cavity and are formed in the purifying shell;
      a filtering component arranged in the purifying cavity and configured to filter air which flows into the purifying cavity from the purifying inlet;
   an air supply apparatus, comprising:

an air supply shell, wherein an interior of the air supply shell is hollow to form an air supply cavity;

an air supply inlet and an air supply outlet which communicate with the air supply cavity and are formed in the air supply shell, wherein the air supply apparatus is configured to supply air outwards;

an air guide apparatus comprising:

an air guide shell, wherein an interior of the air guide shell is hollow to form an air guide cavity;

an air guide inlet and an air guide outlet formed in the air guide shell such that the air guide inlet communicates with the purifying outlet and the air guide outlet communicates with the air supply inlet, whereby the air guide apparatus is configured to deliver air output by the purifying apparatus into the air supply apparatus; and an air flow driving apparatus disposed in the purifying apparatus and configured to drive an air flow to enter the purifying cavity from outside of the purifying shell via the purifying inlet, flow through the air guide apparatus and the air supply apparatus, and then flow out from the air supply outlet.

2. The air purifying device according to claim 1, wherein the air flow driving apparatus comprises:

a first impeller disposed in the purifying cavity; and a first motor having an output end coupled to the first impeller so as to drive the first impeller to rotate.

3. The air purifying device according to claim 1, further comprising:

a rotating component configured to drive the air supply apparatus to rotate about an axis of the purifying apparatus; and a pitching component, configured to drive the air supply apparatus to pitch relative to the purifying apparatus.

4. The air purifying device according to claim 1, further comprising:

a rotating component, configured to drive the air supply apparatus to rotate about an axis of the purifying apparatus; or a pitching component, configured to drive the air supply apparatus to pitch relative to the purifying apparatus.

5. The air purifying device according to claim 3, wherein the rotating component comprises:

a generally tubular shaped rotating body disposed in the purifying shell, the generally tubular shaped rotating body having an upper opening and a lower opening, the lower opening communicating with the purifying cavity, a shape and size of the upper opening being matched with a shape and size of the air guide inlet, the upper opening connected with and in communication with the air guide inlet of the air guide shell; and a rotating driving portion fixedly connected with the rotating body and configured to drive the rotating body to rotate relative about an axis of the purifying shell, wherein when the rotating body rotates, the air guide apparatus is driven to rotate synchronously.

6. The air purifying device according to claim 5, wherein:

an opening is formed at the bottom end of the air guide shell, and the rotating component further comprises an upper cover; and the upper cover is arranged at the opening and configured to seal a gap between the opening and the rotating body.

7. The air purifying device according to claim 6, wherein the upper cover is fixedly connected with the rotating body so as to rotate synchronously with the rotating body.

8. The air purifying device according to claim 5, wherein the rotating driving portion comprises:

a rotating motor having a rotating power output end and configured to output rotating power; and a rotating transmission part fixedly connected with the rotating power output end and the rotating body respectively and configured to transmit the rotating power output by the rotating motor to the rotating body.

9. The air purifying device according to claim 6, wherein the pitching component comprises:

a pitching motor having a pitching power output end and configured to output rotational power; and a pitching transmission part fixedly coupled to the pitching power output end and the air supply shell respectively, and configured to transmit pitching power output by the pitching motor to the air supply shell so as to make the air supply shell perform pitching motion.

10. The air purifying device according to claim 9, wherein the pitching transmission part is further fixedly connected with the upper cover or the rotating body so as to rotate synchronously with the upper cover or the rotating body as the upper cover or the rotating body rotates.

11. The air purifying device according to claim 9 wherein the pitching transmission part comprises:

a main body portion comprising opposing first and second ends;

a first connection portion comprising opposing first and second ends, wherein the first end of the first connection portion is fixed to the air supply shell, and the second end of the first connection portion is movably coupled to the first end of the main body portion through a first movable part; and a second connection portion, comprising opposing first end and a second ends, wherein the first end of the second connection portion is fixed to the rotating body or the upper cover, and the second end of the second connection portion is movably connected with the second end of the main body portion through a second movable part.

12. The air purifying device according to claim 11, wherein the pitching motor comprises:

a first pitching motor fixed to the main body portion, wherein a torque output end of the first pitching motor is in transmission connection with the first movable part such that when the first pitching motor is in operation, the first movable part is driven to rotate so as to drive the first connection portion to rotate relative to the second connection portion; and a second pitching motor fixed to the rotating body wherein a torque output end of the second pitching motor is in transmission connection with the second movable part such that when the second pitching motor is in operation, the second movable part is driven to rotate so as to drive the second connection portion to rotate relative to the rotating body.

13. The air purifying device according to claim 11, wherein the first movable part and the second movable part each comprise at least one gear.

14. The air purifying device according to claim 1, wherein the air supply shell has a gradual-expanded trumpet-shaped structure that expands increasingly in a flowing direction of the air flow.

15. The air purifying device according to claim 1, wherein the air guide shell is made of a flexible material so that the air guide shell can be bent.

16. The air purifying device according to claim 1, wherein the air guide shell is in a tubular shape.

17. An air purifying device comprising:

a purifying apparatus comprising:

a purifying shell, wherein an interior of the purifying shell is hollow to form a purifying cavity;

a purifying inlet and a purifying outlet in communication with the purifying cavity and formed in the purifying shell;

a filtering component disposed in the purifying cavity and configured to filter air which flows into the purifying cavity from the purifying inlet;

an air supply apparatus comprising an air supply shell, wherein an interior of the air supply shell is hollow to form an air supply cavity;

an air supply inlet and an air supply outlet which communicate with the air supply cavity and which are formed in the air supply shell, wherein the air supply apparatus is configured to supply air outwards;

an air guide apparatus comprising an air guide shell, wherein an interior of the air guide shell is hollow to form an air guide cavity;

an air guide inlet and an air guide outlet formed in the air guide shell, the air guide inlet communicating with the purifying outlet, the air guide outlet communicating with the air supply inlet, whereby the air guide apparatus is configured to deliver air output by the purifying apparatus into the air supply apparatus; and an air flow driving apparatus arranged in the air supply apparatus and configured to drive an air flow to enter the purifying cavity from outside of the purifying shell via the purifying inlet, flow through the air guide apparatus and the air supply apparatus, and then flow out from the air supply outlet.

18. The air purifying device according to claim 17, wherein the air flow driving apparatus comprises:

a second impeller disposed in the air supply cavity; and a second motor having an output end coupled to the second impeller so as to drive the second impeller to rotate.

\* \* \* \* \*